G. R. WILLIAMS.
TIRE CONSTRUCTION.
APPLICATION FILED MAR. 16, 1921.
1,421,115. Patented June 27, 1922.
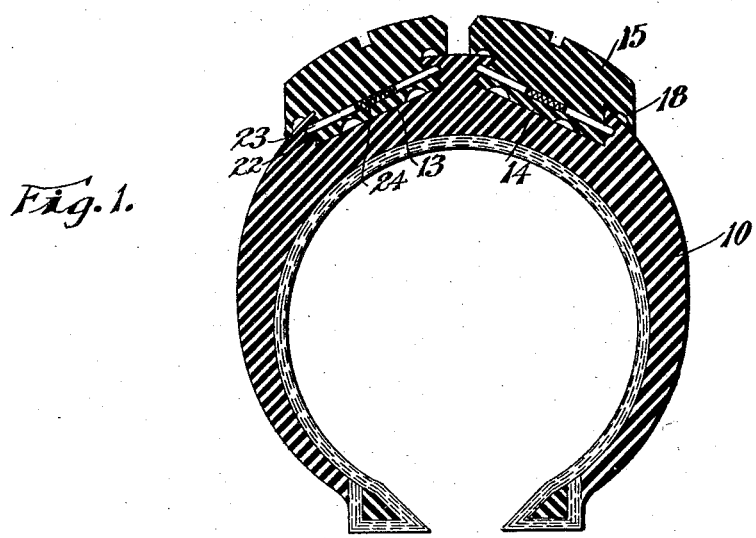
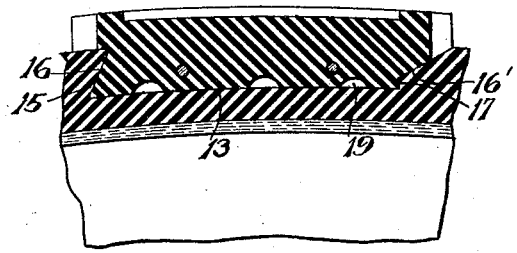
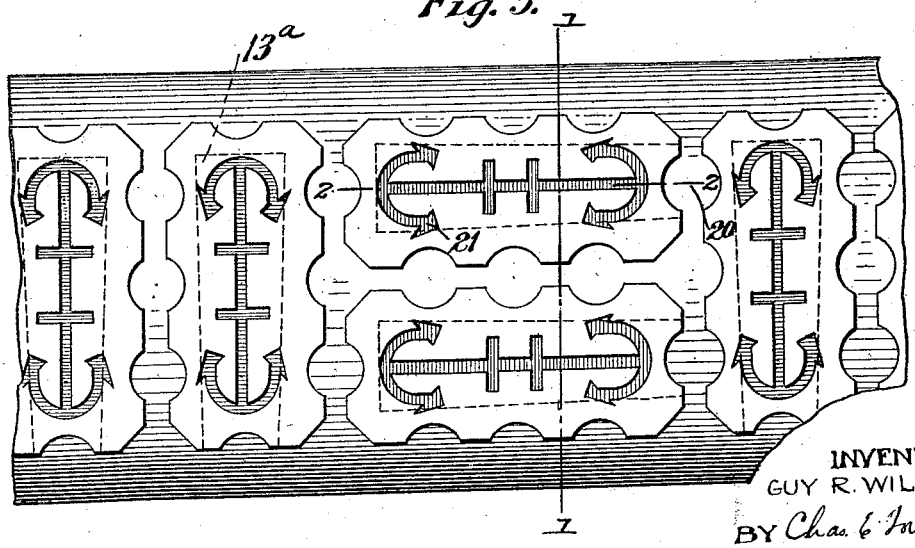
INVENTOR
GUY R. WILLIAMS
BY Chas. C. Townsend
ATTY.

UNITED STATES PATENT OFFICE.

GUY R. WILLIAMS, OF SAN FRANCISCO, CALIFORNIA.

TIRE CONSTRUCTION.

1,421,115. Specification of Letters Patent. Patented June 27, 1922.

Application filed March 16, 1921. Serial No. 452,668.

*To all whom it may concern:*

Be it known that I, GUY R. WILLIAMS, a citizen of the United States, residing at San Francisco, in the county of San Francisco and State of California, have invented new and useful Improvements in Tire Constructions, of which the following is a specification.

This invention relates to a tire construction, and particularly pertains to removable treads for pneumatic tires.

It is the principal object of the present invention to provide a pneumatic tire casing, upon which detachable tread blocks are disposed in a manner to hold them rigidly and immovable against the tractive efforts of the vehicle, and by means which permit them to be readily detached or interchanged.

The present invention contemplates the use of a tire casing having circumferentially extending or transverse grooves into which the dove-tailed bases of tread blocks may be removably positioned, means being provided to lock the tread blocks in their operative positions if desired.

The invention is illustrated by way of example in the accompanying drawings, in which:

Figure 1 is a view in transverse section on the line 1—1 of Figure 3 through a pneumatic tire casing embodying the present invention.

Fig. 2 is an enlarged view in section taken circumferentially of the tire on the line 2—2 of Figure 3, and showing one of the circumferentially extending tread blocks in position.

Fig. 3 is an enlarged fragmentary view showing a portion of the tire tread, disclosing the tread blocks as extending circumferentially and transversely.

Referring more particularly to the drawings, 10 indicates a pneumatic tire casing. This casing is of conventional design, here being shown as formed with straight tire beads. The tread portion of the casing is of considerable thickness in section, and is formed with a series of circumferentially extending grooves 13, and in some instances a complete set of lateral grooves 13ª or circumferential grooves 13. The circumferential grooves are formed with flat bottom surfaces and inwardly inclined side walls to receive the dove-tailed base portions 14 of tire blocks 15. These blocks may be of any desired length, and the circumferentially extending blocks are formed with a forwardly inclined face 16 at one end, and an undercut face 16' at the opposite ends. The undercut face 16' terminates in a square shoulder 17 adapted to lock the block against longitudinal movement in the groove.

The body portion of the tread blocks are of greater width than their grooved bases and are intended to overhang the face of the tire, as more clearly shown in Fig. 1. The under faces of these overhanging portions are cut to conform to the contour of the tire and are further provided with a series of recesses 18 forming suction cups by which the casing and the blocks are held together. These cups may also be formed in the bottom of the tire as indicated at 19, and along the edges of the dove-tailed portion if desired. The blocks are all disposed in spaced relation to each other and their adjacent edges are recessed as indicated at 20. This provides recessed gripping faces throughout the surface of the tread. Other recesses in the form of anchors 21 are impressed upon the blocks and tend to increase the gripping action.

In the event that the blocks are not held in by the action of the square shoulder 17, lock fingers 22 are forced out from the dove-tailed base 14 of the blocks and into recesses 23 formed along the sides of the grooves 13. Spring members 24 act against the end of the lock pins to produce this action.

In operation of the present invention the tread blocks are bent and their forward ends 15 are forced into the grooves. The blocks then may be shoved in their seated positions, while their under faces are forced along the inclined face at the end of the groove. When the square shoulder 17 of the block has passed the end of the face the block will be seated and locked. Additional locking action will then take place by the expansion of spring 24 forcing the lock pins 22 into the recesses 23.

It will thus be seen that by the structure here disclosed it is possible to provide a tire with a tread which may be readily and inexpensively removed and the parts thereof interchanged when desired.

While I have shown the preferred form of my invention as now known to me, it will be understood that various changes might be made in the combination, construction and arrangement of parts by those skilled in the art, without departing from the spirit of the invention as claimed.

Having thus described my invention, what I claim and desire to secure by Letters Patent is:

1. A tire structure including a casing having a plurality of dove-tailed grooves closed at one end and open at the other and provided at the open end with a transverse shoulder extending entirely across the open end of the grooves at the bottom thereof, and a plurality of detachable tread blocks having a dove-tailed base to engage the grooves and provided at one end of the base with the shoulder extending entirely across the same and engaging the said shoulder of the grooves whereby the blocks are held against longitudinal movement in the grooves.

2. A tire structure including a casing having a plurality of grooves dove-tailed at their side walls and open at one end and closed at the other end, said casing being provided at the closed ends of the grooves with undercut transversely disposed end walls and having transverse shoulders extending across the open ends of the grooves, and a plurality of detachable dove-tailed blocks fitting the dove-tailed side walls of the grooves and having one end engaged beneath the undercut end walls of the grooves and provided at the other end with transverse shoulders engaging the transverse shoulder at the open end of the grooves, whereby the blocks when seated in the grooves will be held against longitudinal movement.

3. A tire structure including a plurality of dove-tailed grooves closed at one end and open at the other and provided at the closed end with an inclined undercut wall and at the open end with a shoulder, and a plurality of detachable dove-tailed tread blocks fitting the said grooves and having one end beveled to engage the undercut end wall and provided at its other end with a shoulder to engage the shoulder of the groove, said blocks and casing being beveled above the said shoulders to permit an easy entrance of the blocks into the grooves.

4. A tire structure including a casing provided with a plurality of grooves, a plurality of tread blocks interlocked at their side edges with the grooves and slidable into and out of engagement with the same, and laterally extending locking devices carried by the blocks and engaging the walls of the grooves for locking the blocks therein.

5. A tire structure including a casing provided with a plurality of grooves, a plurality of tread blocks interlocked at their side edges with the grooves and slidable into and out of engagement with the same, and transverse spring actuated lock pins carried by the blocks and engaging the walls of the grooves to secure the tread blocks therein.

6. A tire structure including a casing provided with a plurality of grooves, a plurality of tread blocks interlocked at their side edges with the grooves and slidable into and out of engagement with the same, alined transversely disposed lock pins carried by the blocks and arranged to engage the walls of the grooves to secure the blocks therein, and springs interposed between the inner ends of the alined lock pins for urging the latter outwardly into engagement with the said walls.

7. In a device of the character described a tread block comprising a substantially rectangular body portion, the underface of which is provided with a tongue by which the block may be secured to a tire casing, and expansion means within and carried by said tongue and projecting laterally at opposite sides of the block to engage the adjacent portions of the casing for locking the block to the casing.

GUY R. WILLIAMS.